United States Patent
Harwood et al.

(10) Patent No.: US 11,216,314 B2
(45) Date of Patent: Jan. 4, 2022

(54) DYNAMIC REALLOCATION OF RESOURCES IN ACCELERATOR-AS-A-SERVICE COMPUTING ENVIRONMENT

(71) Applicant: EMC IP Holding Company LLC, Hopkinton, MA (US)

(72) Inventors: John S. Harwood, Paxton, MA (US); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 134 days.

(21) Appl. No.: 16/179,531

(22) Filed: Nov. 2, 2018

(65) Prior Publication Data

US 2020/0142753 A1 May 7, 2020

(51) Int. Cl.
*G06F 9/50* (2006.01)
*G06F 9/48* (2006.01)
(Continued)

(52) U.S. Cl.
CPC ........ *G06F 9/5088* (2013.01); *G06F 9/45558* (2013.01); *G06F 9/4856* (2013.01);
(Continued)

(58) Field of Classification Search
CPC .... G06F 9/5088; G06F 9/505; G06F 9/48956; G06F 9/45558; G06F 9/52; G06F 9/5072; G06F 2009/4557
See application file for complete search history.

(56) References Cited

U.S. PATENT DOCUMENTS 9,703,500 B2 * 7/2017 Fiske .................... G06F 3/0649
9,870,333 B1 * 1/2018 Lam .................... G06F 13/4027
(Continued)

OTHER PUBLICATIONS

Roberto H Jacob Da Silva et al., "Introduction to Lenovo Network Telemetry," Lenovo Press, May 2018, 11 pages.
(Continued)

*Primary Examiner* — Lewis A Bullock, Jr.
*Assistant Examiner* — Kevin X Lu
(74) *Attorney, Agent, or Firm* — Ryan, Mason & Lewis, LLP

(57) ABSTRACT

Systems and methods are provided for dynamically reallocating resources during run-time execution of workloads in a distributed accelerator-as-a-service computing system to increase workload execution performance and resource utilization. A workload is executed in the distributed accelerator-as-a-service computing system using an initial set of resources allocated to the executing workload, wherein the allocated resources include accelerator resources (e.g., physical and/or virtual accelerator resources). The performance of the executing workload is monitored to detect a bottleneck condition which causes a decrease in the performance of the executing workload. In response to detecting the bottleneck condition, another set of resources is reallocated to the executing workload, which is determined to reduce or eliminate the bottleneck condition. A live migration process is performed to move the executing workload to the reallocated set of resources such that the workload execution continues using the reallocated set of resources.

21 Claims, 5 Drawing Sheets

(51) Int. Cl.
  *G06F 9/455* (2018.01)
  *G06F 9/52* (2006.01)
(52) U.S. Cl.
  CPC ............... *G06F 9/505* (2013.01); *G06F 9/52* (2013.01); *G06F 2009/4557* (2013.01)

(56) References Cited

U.S. PATENT DOCUMENTS

| | | | | |
|---|---|---|---|---|
| 10,042,578 | B2* | 8/2018 | Karve | G06F 3/0685 |
| 2011/0161972 | A1* | 6/2011 | Dillenberger | G06F 9/5044 |
| | | | | 718/104 |
| 2012/0246638 | A1* | 9/2012 | He | G06F 9/45558 |
| | | | | 718/1 |
| 2013/0304842 | A1* | 11/2013 | Zachariassen | G06F 16/172 |
| | | | | 709/213 |
| 2013/0332778 | A1* | 12/2013 | Spracklen | G06F 11/3409 |
| | | | | 714/47.1 |
| 2014/0208018 | A1* | 7/2014 | Benhase | G06F 12/0806 |
| | | | | 711/113 |
| 2018/0024739 | A1* | 1/2018 | Schmisseur | G06F 3/065 |
| | | | | 711/105 |
| 2018/0088997 | A1* | 3/2018 | Min | G06F 9/45533 |
| 2018/0150240 | A1* | 5/2018 | Bernat | H03M 7/40 |
| 2018/0219955 | A1* | 8/2018 | Chen | H04L 43/0805 |
| 2018/0276134 | A1* | 9/2018 | Cherubini | G06F 12/0888 |
| 2018/0373553 | A1* | 12/2018 | Connor | G06F 9/45558 |
| 2019/0026030 | A1* | 1/2019 | Yang | G06F 3/0688 |
| 2019/0068557 | A1* | 2/2019 | Noel | G06F 3/067 |
| 2019/0171577 | A1* | 6/2019 | Arcangeli | G06F 12/1009 |
| 2019/0182178 | A1* | 6/2019 | Krishnamurthy | G06F 9/5088 |
| 2019/0317829 | A1* | 10/2019 | Brown | G06F 9/5077 |
| 2019/0363950 | A1* | 11/2019 | Li | H04L 41/5019 |
| 2020/0012516 | A1* | 1/2020 | Kodama | G06F 9/5077 |

OTHER PUBLICATIONS

"VMware VMotion: Live Migration of Virtual Machines Without Service Interruption," https://www.vmware.com/pdf/vmotion_datasheet.pdf, 2007, 2 pages.

* cited by examiner

US 11,216,314 B2

DYNAMIC REALLOCATION OF RESOURCES IN ACCELERATOR-AS-A-SERVICE COMPUTING ENVIRONMENT

FIELD

The field relates generally to cloud computing systems and, in particular, to techniques for allocating resources for workload execution in a distributed cloud computing system.

BACKGROUND

Currently, various entities provide cloud computing services globally to different customers over various sectors for critical and non-critical applications. These entities provide cloud computing services including, for example, Software-as-a-Service (SaaS), Infrastructure-as-a-Service (IaaS), and/or Platform-as-a-Service (PaaS). A cloud computing system typically comprises a large cluster of servers distributed over one or more data centers for purposes of providing data protection, high availability, and high performance computing, and to otherwise provide sufficient quality of service (QoS) for successful service delivery and meet the obligations of service level agreements (SLAs) with the cloud customers.

Accelerator ("X")-as-a-Service (XaaS) allows cloud users and applications to utilize specialized hardware accelerator resources that exist in different servers within one or more data centers. XaaS allows for pooling, sharing, and optimization of the specialized and expensive hardware accelerators including, but not limited to, graphics processing units (GPUs), tensor processing units (TPUs), application-specific integrated circuits (ASICs), field programmable gate array (FPGAs), image processing units (IPUs), emerging deep learning accelerators (DLAs), advanced graph processors, artificial intelligence (AI) accelerators, and other specialized hardware accelerator resources that are configured to support high-performance computing (HPC) services provided by cloud computing systems. The implementation of XaaS in a distributed computing environment, which comprises a large scale of shared accelerator resources (hardware, virtual, etc.) executing on a cluster of computing nodes, can support various emerging HPC applications such as big data analytics, inference and model training for machine learning and deep learning applications, AI processing, big data analytics, etc.

However, implementing an efficient distributed computing environment for these types of HPC applications is not trivial since the intensive computational workloads, and the massive volume of data which must be stored, streamed, prefetched, and coordinated between the shared computing resources of the distributed computing platform, presents a significant challenge and practical limit on system performance and scalability. Indeed, while running HPC workloads on remote accelerator resources may be beneficial from a cost optimization basis, the benefits of using such remote accelerator resources depend on the amount of bandwidth available between the server(s) running a job and the server(s) with the accelerator device(s) that are being utilized for executing certain workload tasks of the job. In a low latency, high bandwidth environment, a remote accelerator device may provide significantly higher performance, but if bandwidth becomes limited, executing the workload locally on a slower central processing unit (CPU) may provide better performance. Therefore, in distributed computing environments, mechanisms are needed to optimize resource utilization and ensure enhanced performance of running workloads.

SUMMARY

Embodiments of the invention include methods for dynamically reallocating resources during run-time execution of workloads in a distributed accelerator-as-a-service computing system to increase workload execution performance and resource utilization. For example, in one embodiment, a method comprises: executing a workload in a distributed accelerator-as-a-service computing system using a first set of resources allocated to the executing workload, wherein the first set of resources comprises accelerator resources; monitoring a performance of the executing workload to detect a bottleneck condition which causes a decrease in the performance of the executing workload; responsive to detecting the bottleneck condition, determining a second set of resources to reallocate to the executing workload, which would result in at least one of reducing and eliminating the bottleneck condition; performing a live migration process to move the executing workload to the second set of resources; and executing the workload using the second set of resources.

Other embodiments of the invention include, without limitation, computing systems and articles of manufacture comprising processor-readable storage media which are configured to dynamically reallocate resources during run-time execution of workloads in a distributed accelerator-as-a-service computing system.

DETAILED DESCRIPTION

Embodiments of the invention will now be described in further detail with respect to systems and methods for dynamically reallocating resources during run-time execution of workloads in a distributed XaaS computing system to increase workload execution performance and resource utilization. As explained in further detail below, dynamic reallocation of resources in a distributed XaaS computing system involves real-time monitoring of the execution performance of a running workload to identify potential bottlenecks, and migrating live workloads and/or data to different resources or locations within the XaaS computing system, or to a remote XaaS computing system, to increase workload execution performance and resource utilization. Exemplary systems and methods for dynamic reallocation of computing resources as described herein address various aspects of cloud computing such as (i) critical asset network connectivity issues, (ii) storage throughput issues, and (iii) real-time migration of executing workloads to different data centers or different computing systems with specialized hardware optimizations.

Figure 1:
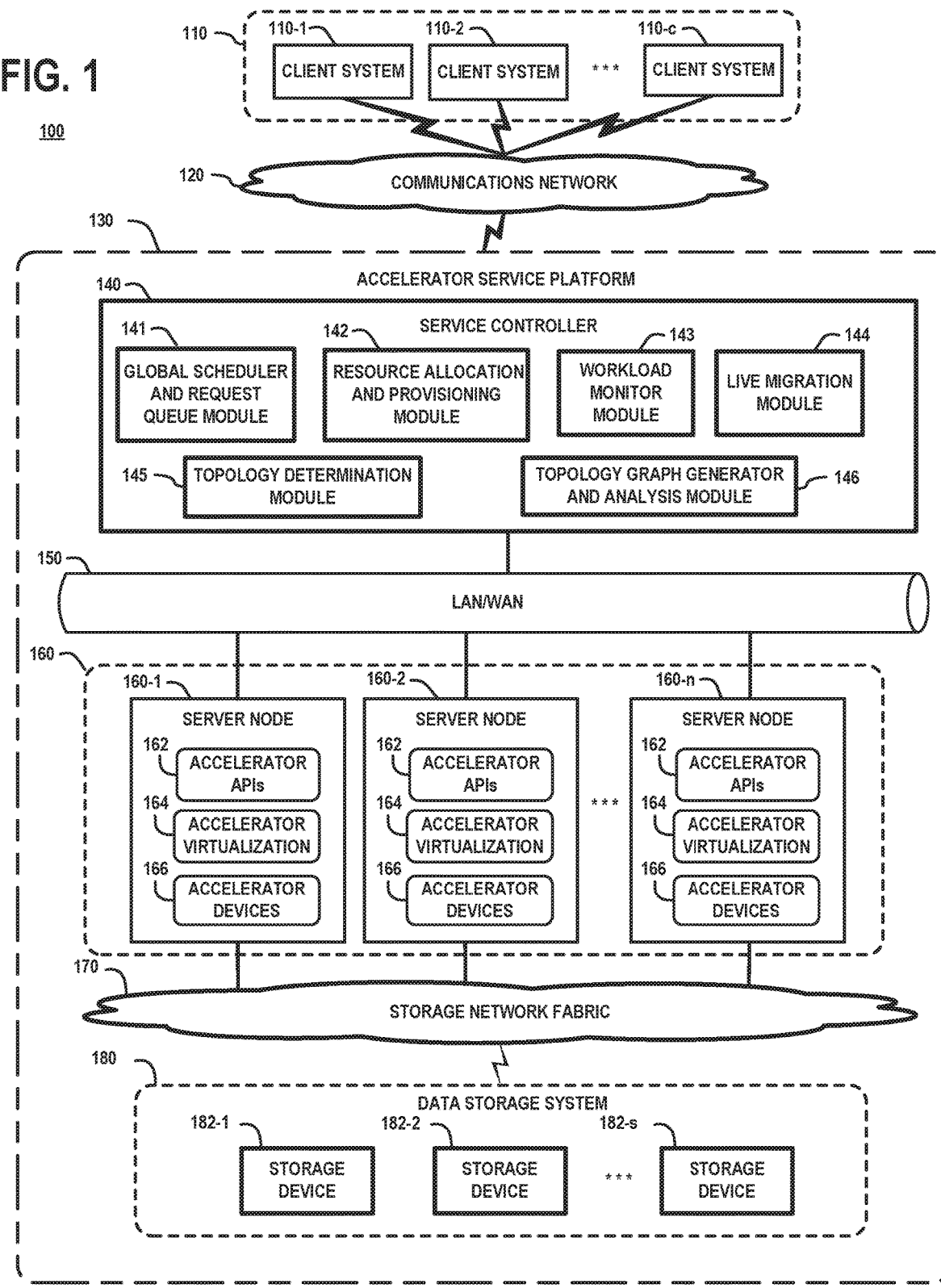
FIG. 1 illustrates a cloud computing environment in which techniques according to embodiments of the invention are implemented for dynamically reallocating resources during run-time execution of workloads in a distributed XaaS computing system to increase workload execution performance and resource utilization.

FIG. 1 illustrates a cloud computing environment in which techniques according to embodiments of the invention are implemented for dynamically reallocating resources during run-time execution of workloads in a distributed XaaS computing system to increase workload execution performance and resource utilization. In particular, FIG. 1 schematically illustrates a computing system 100 which comprises a plurality of client systems 110-1, 110-2, . . . , 110-c (collectively referred to as client systems 110), a communications network 120, and an accelerator service platform 130. The accelerator service platform 130 provides XaaS cloud services, which can be accessed by the client systems 110 over the communications network 120. The accelerator service platform 130 comprises a service controller 140 (e.g., a control server node), a service platform network 150, a server cluster 160 (e.g., server farm) comprising a plurality of server nodes 160-1, 160-2, . . . , 160-n, a storage network fabric 170, and a data storage system 180 comprising a plurality of data storage devices 182-1, 182-2, . . . , 182-s.

The service controller 140 comprises a global service request scheduler and request queue module 141, a resource allocation and provisioning module 142, a workload monitor module 143, a live migration module 144, a topology determination module 145, and a topology graph generator and analysis module 146, the functions of which will be explained in further detail below. The server nodes 160-1, 160-2, . . . , 160-n each comprise accelerator application programming interfaces (APIs) 162, an accelerator virtualization layer 164, and hardware accelerator devices 166. The hardware accelerator devices 166 include one or more types of hardware accelerator devices including, but not limited to, GPUs, FPGAs, ASICs, TPUs, IPUs, and other types of hardware accelerator devices and systems that are configured to support high-performance computing services provided by the accelerator service platform 130. In this regard, in some embodiments, the server cluster 160 may comprise a homogenous cluster of server nodes which implement one type of accelerator resources (e.g., GPU devices). In other embodiments, the server cluster 160 comprises a heterogeneous cluster of server nodes which implement two or more different types of accelerator resources (GPU devices, TPUs, etc.). The server nodes 160-1, 160-2, . . . , 160-n of the server cluster 160 may implement one of many types of commercially available server operating systems including, but not limited to, a Windows server, a Sun Solaris server, an HP server, a Linux server, etc.

The accelerator APIs 162 provide libraries, drivers, prewritten code, classes, procedures, scripts, configuration data, etc., which (i) can be called or otherwise utilized by the accelerator devices 164 during execution of workloads (e.g., deep learning model training tasks) by the server nodes 160, or which (ii) are utilized by control functions executing on host processor devices of the server nodes to access or communicate with the accelerator devices 166 through accelerator device drivers. The types of software libraries and accelerator APIs 162 that are implemented will vary depending on the types of accelerator devices used. For example, the accelerator APIs 162 may comprise commercially available libraries and API platforms such as CUDA®, which is a parallel computing platform and application programming interface created by NVIDIA. The CUDA API enables the use of CUDA-enabled GPUs for general purpose processing. The CUDA platform is a software layer that allows direct access to the instruction set and parallel computational elements of a GPU for executing compute kernels.

The accelerator virtualization layers 164 each comprise a virtualization engine and a hypervisor platform, which are configured to create virtual accelerator resources (e.g., virtual GPUs, virtual TPUs, etc.) which allow virtual machines executing on host servers 160 to access and share the physical accelerator devices 166 with other servers or computing systems. The accelerator device drivers of the accelerator APIs 162 provide virtual drivers that allow the virtual machines to access and control the virtual accelerator resources that are instantiated within the accelerator virtualization layer 164. The accelerator virtualization layer 164 allows the accelerator service platform 130 to provision virtual accelerator resources to execute different types of workloads (e.g., a data-parallel deep learning model training task) using a hybrid set of different types of accelerator resources (e.g., GPUs, TPUs, etc.) with different performances and architectures.

The client systems 110 comprise various types of computing devices such as desktop computers, laptop computers, electronic tablets, etc. In another embodiment, the client systems 110 may comprise servers in a data center which require accelerator processing services. The communications network 120 is configured to enable network communication between the client systems 110 and the accelerator service platform 130. While the communications network 120 is generically depicted in FIG. 1, it is to be understood that the communications network 120 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 120 in some embodiments comprises combinations of multiple different types of communications networks each comprising network devices configured to communicate using Internet Protocol (IP) or other related communication protocols. The network 120 comprises intermediate points (such as routers, switches, etc.) and other elements that form a network backbone to establish communication paths and enable communication between network endpoints.

The service platform network 150 is configured to enable communication between the service controller 140 and the server nodes 160-1, 160-2, . . . , 160-n of the server cluster 160, as well as to enable peer-to-peer network communication between the server nodes 160-1, 160-2, . . . , 160-n within the server cluster 160. Depending on the network distribution and geographic location of the constituent components and nodes of the accelerator service platform 130, the service platform network 150 may comprise, for example, a LAN, a WAN, or a combination of one or more LANs and WANs, as well as other types of communication networks that are commonly used to implement cloud computing systems. The storage network fabric 170 can be implemented using any suitable networking system and protocol to enable shared access to the data storage system 180 by the server nodes 160-1, 160-2, . . . , 160-n of the server cluster 160. In one embodiment, the service platform network 150 and the storage network fabric 170 can be integrated into a converged framework such as a converged Ethernet framework using known techniques.

The data storage system 180 can be implemented using any suitable data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The data storage devices 182-1, 182-2, . . . , 182-s comprise non-volatile storage media to provide persistent storage resources for the server nodes 160-1, 160-2, . . . , 160-n of the server cluster 160 (e.g., to store training data used for deep learning applications). The data storage devices 182-1, 182-2, . . . , 182-s may include one or more different types of persistent storage devices, or data storage arrays, such as hard disk drives (HDDs) or solid-state drives (SSDs), or other types and combinations of non-volatile memory. In one embodiment, the data storage devices 182-1, 182-2, . . . , 182-s are implemented using, for example, an enterprise-class storage platform comprising high-performance, scalable storage arrays, which can be implemented for hyper-scale computing systems. For example, the data storage system 180 can be implemented using commercially available storage array systems of Dell EMC including, but not limited to, XtremIO, UNITY, VMAX, VNX, ScaleIO, etc.

The accelerator service platform 130 can be a private or public cloud computing system which implements an XaaS system to provide computing services to end-users or customers for HPC applications such as deep learning applications, machine learning, Big Data processing applications, or other types of HPC applications that are typically implemented using a cloud-based service system to deliver consumer or business applications and services to multiple end users, service providers, and/or organizations. The service controller 140 is configured to implement or otherwise control various functionalities of the accelerator service platform 130 to support XaaS management operations. The service controller 140 and related functions can be distributed across one or more host server nodes of the accelerator service platform 130.

The topology determination module 145 implements methods that are configured to periodically query the server nodes 160, the networks 150 and 170, and the data storage system 180, etc., within the accelerator service platform 130 to automatically discover/identify constituent objects (logical objects and physical objects) of the accelerator service platform 130 (e.g., servers, routers, firewalls, applications, databases, network resources, storage resources, etc.). In a typical computing environment, the sever cluster 160 will be a heterogeneous computing cluster wherein the constituent server nodes 160-1, 160-2, . . . , 160-n are implemented using a wide range of different topologies. The term "topology" as used herein broadly refers to the hardware configuration and intra-node connections of hardware elements of server nodes or storage server node, the network interface elements to support inter-node connections between server nodes within the cluster 160, hardware and network configurations of the data storage system 180, etc.

The topology information collected by the topology determination module 145 for a given server node will indicate the types and number of hardware processor resources (e.g., CPUs, GPUs, other accelerator devices) of the given server node. In addition, the topology information will indicate the types of intra-node connection topologies (communication links) used to connect the hardware processor resources of a given server node. For example, the intra-node connection topologies of a given server node can be implemented using various communication protocols such as a Remote Direct Memory Access (RDMA) protocols, an InfiniBand (IB) protocol, a Peripheral Component Interconnect Express (PCIe) protocol, a NVIDIA® NVLink™ protocol, NVIDIA GPUDirect, and other point-to-point serial interconnect protocols that enable, e.g., CPU-GPU and GPU-GPU communication. Furthermore, a given server node may implement the QuickPath Interconnect (QPI) protocol, which is a point-to-point processor interconnect framework that enables a Non-Uniform Memory Access (NUMA) architecture for a cluster of processors, etc. The intra-node connection topology would include information regarding the types and arrangements of hardware connection elements including, but not limited to, switches (e.g., PCIe switches), Host Bridge, platform controller hub (PCH), etc.

In addition, the topology information collected by the topology determination module 145 includes information regarding the types of network interface devices and topologies that are implemented by the server nodes for inter-node communication within the cluster 160. For example, inter-node topology information for a given server node can include port numbers of the servers, the type of network interface circuitry (and number of interface cards) that a given server utilizes to connect to other servers (and network components) including, but not limited to, network interface controllers (NICs) (e.g. SmartNICs, RDMA-enabled NICs), Host Bus Adapter (HBA) cards, Host Channel Adapter (HCA) cards, and the types of inter-node communication protocols that are used by the server nodes for network communication including, hut not limited to, protocols such as TCP/IP, Gigabit Ethernet (GbE) (e.g., 10/25/40/100 GbE), RDMA, IB, Message Passing Interface (MPI), etc.

In one embodiment of the invention, the server nodes 160, the networks 150 and 170, and the data storage system 180 comprise reporting agents that are configured to determine the hardware configuration and hardware interconnect topology for the nodes and networks by analyzing a layer of low-level system drivers, and report the topology information to the topology determination module 145. The reporting agents comprise software or firmware that run on the server nodes 160-1, 160-2, . . . , 160-n to collect relevant server hardware information and usage and report such information to the topology determination module 145 which maintains such information in a central topology database. In addition, reporting agents may run on switch devices that are configured within the backbone networking infrastructure of the service platform network 150 and storage network fabric 170, as well as run on various elements of the data storage system 180.

The hardware information and interconnect topology detection process can be implemented by composing and analyzing device/system cmd-query results, typically via low-level HW drivers, libraries or APIs. For example, NVIDIA GPU has CUDA API and utilities such as the System Management Interface (nvidia-smi) (which is a command line utility) which can detect accelerator devices on a given server node, along with corresponding interconnect paths between the accelerator devices, processors, and other hardware components of the given server node. Moreover, for CPUs, command utilities such as lscpu, numactl, etc., can be used to determine information regarding the CPU architecture (number of CPUs, threads, cores, sockets, NUMA nodes, CPU caches vendor, family, model, etc.) present on the given GPU server node. Moreover, utilities such as lspci, Mellanox OpenFabrics Enterprise Distribution (OFED), and vendor specific command (cmds) can be used to determine information regarding network adapters (NICs, HBAs, etc.) that are implemented in a given server node.

The topology graph generator and analysis module 146 implements methods to generate a semantic model of the managed environment of the accelerator service platform 130 based on the topology information which is collected/generated by the topology determination module 145. For example, in one embodiment, the topology graph generator and analysis module 146 implements a vertex-centric graph modeling program which is configured to generate a semantic model of the given topology in the form of a topology node graph with vertices and directed edges, wherein the vertices within the topology node graph correspond to classes of objects (virtual or physical) that are detected within the given topology. In one embodiment, the topology node graph is configured to implement and "event model" and associated "propagation model," which defines the objects within the given topology, the events which can be generated by the objects, the relationship between objects, and the events that may propagate along relationships to and from related objects.

The topology graph generator and analysis module 146 utilizes the topology node graph in conjunction with the real-time resource usage information of the resources within the computing platform 130 to determine and make recommendations to the resource allocation and provisioning module 142 for allocating an initial set of resources for a given workload to be launched or for reallocating a set of resources for a currently running workload within the accelerator service platform 130.

The workload monitor module 143 implements methods to monitor the performance of running workloads and to detect bottlenecks by collecting and utilizing telemetry information which provides real-time resource usage information (e.g., on a per application/workload basis) of the running workloads. The telemetry information collected for a given running workload comprises, for example, bus or networking bandwidth usage information (i.e., percent of usage), current bandwidth usage of the communication links between provisioned processor devices (e.g., CPUs, accelerator devices, etc.), CPU and accelerator device utilization, data storage throughput, and other types of resource usage information which can be utilized to monitor for communication overload or bottlenecks that could result in degraded performance of a running workload.

In one embodiment, the telemetry information is continually measured/tracked and periodically reported by the reporting agents (e.g., every 5 seconds). The telemetry information is stored in a resource usage database that is maintained by the workload monitor module 143. The telemetry information for a given running workload is stored in association with a given Application ID that is assigned to the running workload. This allows the workload monitor module 143 to provide specific telemetry updates to the topology graph generator and analysis module 146 with regard to the resource usage of the given workload.

The live migration module 144 implements methods that enable the live migration of running workloads and associated data between resources within the accelerator service platform 130 (e.g., from a source physical server to target physical server) and between resources within the accelerator service platform 130 and another remote cloud service platform. In one embodiment, the live migration module 144 implements VMware® VMotion™ which enables the live migration of running virtual machines from one physical server to another with zero downtime, continuous service availability, and complete transaction integrity.

VMotion implements methods to encapsulate an entire state of a virtual machine by a set of files stored on shared storage. The active memory and precise execution state of the virtual machine is transferred over a high speed network to allow the virtual machine to instantaneously switch from running on a source host server (e.g., ESX Server) to a destination host server. The networks used by the virtual machine are virtualized by the underlying host server (e.g., ESX server) to ensure that after migration, the virtual machine network identity and network connections are preserved. Since the migration of a virtual machine with VMotion preserves the precise execution state, the network identity, and the active network connections, the result is zero downtime and no disruption to users. VMotion allows live migration of workloads over long distances, such as between data centers that are physically located in different geolocations (e.g., different continents). In another embodiment, the live migration module 144 implements methods to enable the migration of applications (e.g., container applications) within the environment of the accelerator service platform 130 and between different cloud service platforms. For example, the live migration module 144 can implement CMotion, which provides a framework for migration of applications into and between clouds.

The service controller 140 receives service requests from the client systems 110 for executing HPC jobs on the server cluster 160 (e.g., distributed DL training, or other HPC jobs), and the received service requests are stored in a request queue that is controlled by the global schedule and request queue module 141. A service request can include various user-specified conditions and demands for executing a given job (e.g., DL training) associated with the service request. For example, a service request may specify (i) a desired number (N) of accelerator devices (e.g., GPU devices) to provision for the requested job, (ii) a specific type/model of accelerator device (e.g., NVIDIA P100GPU, Tensor flow TPU, etc.) to be utilized for the requested job, (iii) whether the provisioned accelerator devices should be exclusively allocated for the requested job or can be shared with other jobs, and/or (iv) other conditions based on a service level agreement (SLA) with the given client. In addition, the provisioning of accelerator resources for pending jobs can be based on predefined policies of the service provider of the accelerator service platform for handling specific types of jobs.

The service request and associated provisioning specifications are stored in the request queue pending scheduling by the global scheduler and request queue module 141. The resource allocation and provisioning module 142 will communicate with the topology graph generator and analysis module 146 to request a set of resources to allocate and provision for a new workload based on, e.g., an application ID, constraints, policies, user-specified conditions, etc. The topology graph generator and analysis module 146 will analyze the current topology graph in view of the current resource usage of the resources within the accelerator service platform 130 to recommend a set of resources which can be allocated and provisioned for executing the given workload associated with the given application ID, based on the specified constraints, policies, etc. The resource allocation and provisioning module 142 will allocate the resources in the proper locality within the accelerator service platform 130 based on the current topology and constraints, and push subgraphs of the topology to compute nodes for purposes of telemetry (e.g., the topology graphs are analyzed and updated based on, e.g., telemetry information, to maintain a current view of the occupancy of resources in the topology node graph).

In a cloud computing system such as shown in FIG. 1 there is a potential for various types of bottlenecks to arise in providing XaaS. For example, bottlenecks can arise due to (i) increased demand on a CPU resource that is used for, e.g., standard processing by a container or data transformation, (ii) increased access to data storage, (iii) decreased bandwidth between a container or virtual machine running a main workload and virtual resources (e.g. vGPU), etc. Further, some workloads (e.g., deep learning) may run for a significant amount of time. If such workloads are not dynamically optimized during run-time, the computing system may exhibit poor performance with degraded quality of service. Some workloads execute a single time, such that looking at historical runs may not be beneficial for such workloads. Further, CPU load, network load and/or storage load may change during run-time of workloads, which can adversely affect computing performance for executing the workloads. For example, the advantages to running a CPU hungry container which leverages a remote virtual GPU may become less beneficial in circumstances where there are other tasks running on the same server as the CPU, especially if the tasks are scheduled by a different scheduler.

In accordance with embodiments of the invention, systems and methods are provided to dynamically reallocate computing resources in a computing environment, wherein the dynamic reallocation is based on a real-time analysis of the workload within the computing environment where bottlenecks may appear in multiple locations within the computing environment. As explained in further detail below, dynamic reallocation of computing resources address various aspects of cloud computing such as (i) critical asset network connectivity issues, (ii) storage throughput issues, and (iii) real-time migration of executing workloads to different data centers or different computing platforms with specialized hardware optimizations.

In particular, with regard to critical asset network connecting issues, a common problem in an XaaS environment is leveraging the shared infrastructure such as the latency and bandwidth between a CPU running a workload and a specialized hardware resource. Indeed, increased latency and reduced bandwidth can affect the performance significantly as compared to running the workload on the same server which contains the specialized hardware and thus reduce utilization significantly. The performance depends on various factors such as (i) the chattiness of the protocol (which depends on the workload), (ii) the bandwidth between the server machine where the workload is running, and the server machine which includes the specialized hardware, and (iii) the latency between the two servers (the one running the CPU and the one containing the specialized hardware).

Figure 2:
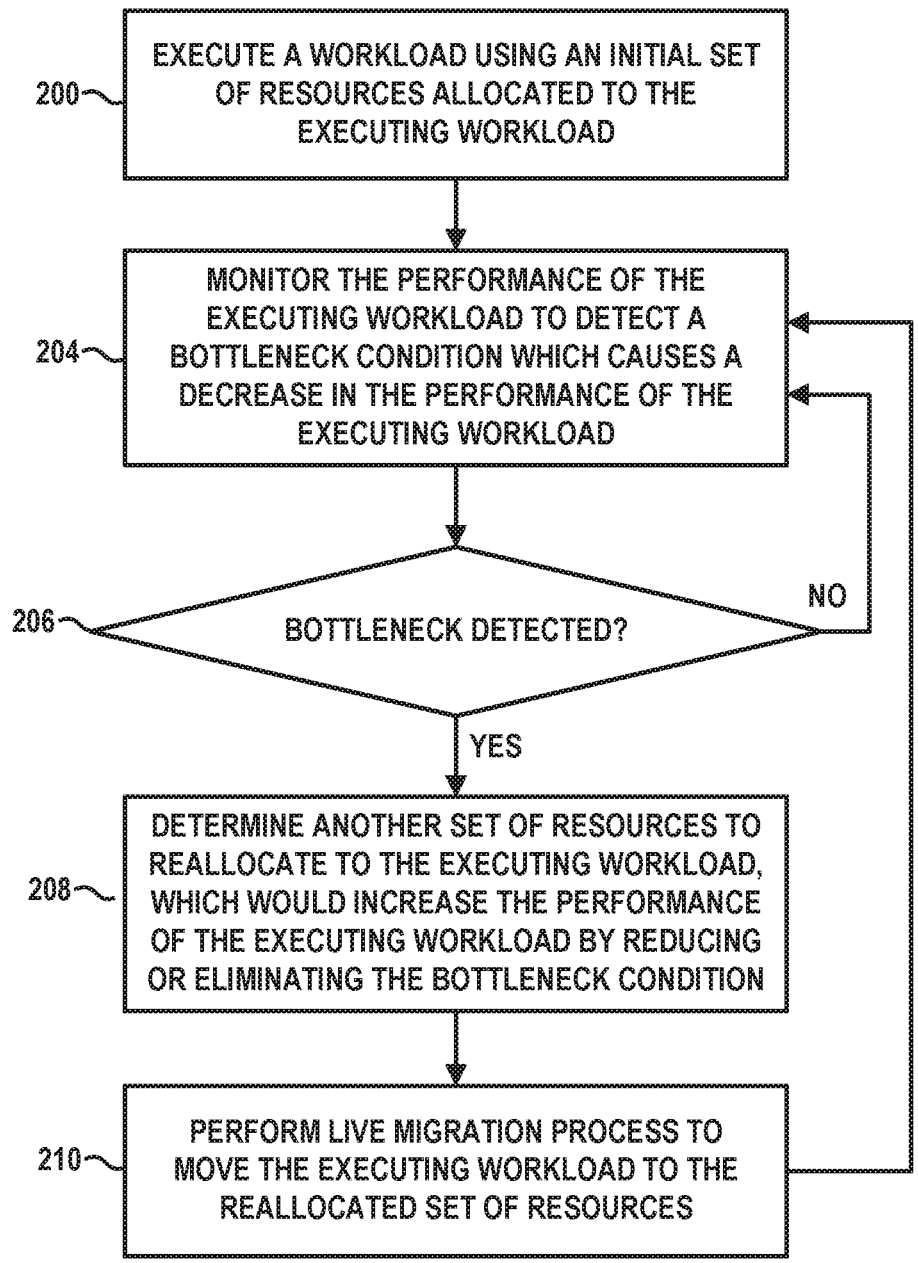
FIG. 2 is a flow diagram of a method for dynamically reallocating resources during run-time execution of workloads in a distributed XaaS computing system, according to an embodiment of the invention.

FIG. 2 is a flow diagram of a method for dynamically reallocating resources during run-time execution of workloads in distributed XaaS computing system, according to an embodiment of the invention. In one embodiment, FIG. 2 illustrates operating modes of various modules of the service controller 140 in the accelerator service platform 130 of FIG. 1. The accelerator service platform 130 executes a given workload using an initial set of resources that are allocated to the given workload by the resource allocation and provisioning module 142 (block 200). During real-time execution of the given workload, the workload monitor module 143 of the service controller 140 will monitor the performance of the executing workload in real-time to detect a bottleneck condition which causes a decrease in the performance of the executing workload (block 204). In response to detecting a bottleneck condition (affirmative determination in block 206), the resource allocation and provisioning module 142 will determine and provision a second set of resources to reallocate to the executing workload, with the expectation that such reallocation will increase the performance of the executing workload by either mitigating or eliminating the detected bottleneck condition (block 208). The live migration module 144 is then invoked to perform a live migration process to move the executing workload to the reallocated set of resources (block 210). The workload execution continues using the reallocated set of resources, and the monitoring continues to detect for bottleneck conditions of the executing workload (block 204). In another embodiment, live migration of the workload will be performed when the cost of movement is not significant as compared to the gain in performance.

The dynamic reallocation of resources (in block 208) can be performed to address bottleneck conditions that arise with respect to critical asset network connectivity issues. For example, when a bottleneck arises in a given location, the running workload can be live migrated to another location away from the bottleneck. By way of example, assume a first processor (e.g., CPU) executes a workload on a first host server and communicates with a second processor (e.g., an accelerator resource such as a virtual and/or physical GPU resource) on a second host server. The workload monitor module 143 can monitor the latency of communication and bandwidth of communication between the first processor and a second processor executing the workload, and determine that a bottleneck condition arises when there is an increase in the latency of communication between the first and second processors and/or a decrease in the bandwidth of communication between the first and second processors. This may occur, for example, if the protocol is too "chatty." A chatty protocol is an application or routing protocol that requires a client or server to wait for an acknowledgement before it can transmit again. On a wide area network, the wait time (e.g., latency) can be relatively long when there is a large distance between the communicating resources. Extended wait times can significant degrade perceived performance and QoS.

To enhance performance, a third processor (e.g., CPU) executing on the second host server can be reallocated in place of the first processor (e.g., CPU) for executing the workload in conjunction with the second processor. In this instance, dynamic resource reallocation is performed to migrate the workload to be executed by a CPU on the same host server as the accelerator resource. In another embodiment, dynamic resource reallocation can be performed by allocating different processors altogether (e.g., utilizing third and fourth processors in place of the first and second processors) which reside on the same host server or different host servers. In this instance, the running workload can be migrated to another server if, for example, the server provides higher bandwidth and lower latency to the specialized accelerator resource. The workload can be migrated to a server which is different than the server containing the specialized hardware if the bottleneck is the CPU and the server with the specialized hardware is loaded. Another consideration is to perform active management of resources and invoke QoS controls in an application server, a resource server, or a network to address bottlenecks.

Figure 3:
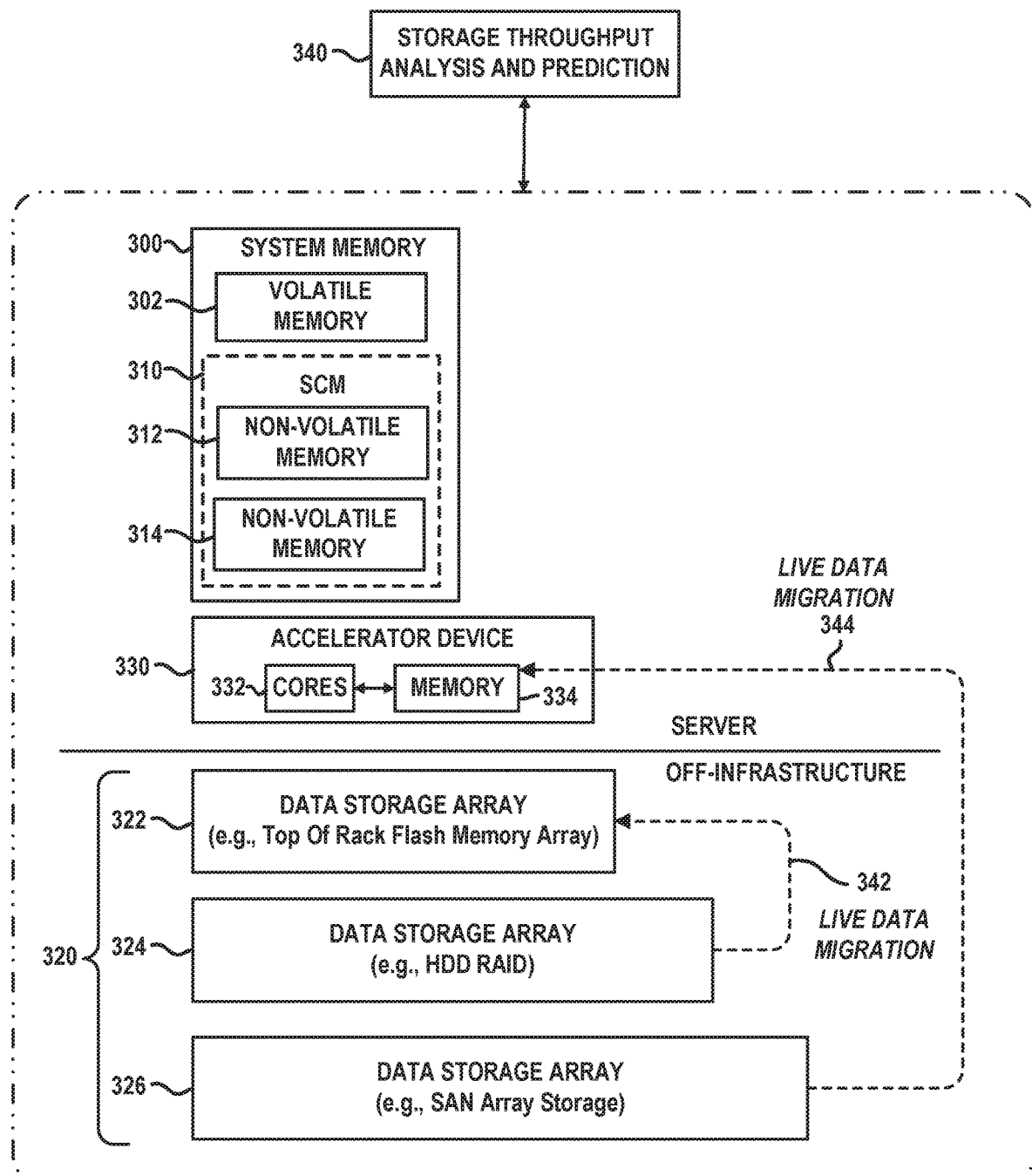
FIG. 3 schematically illustrates methods for dynamically reallocating storage and memory resources during run-time execution of workloads in a distributed XaaS computing system, according to an embodiment of the invention.

FIG. 3 schematically illustrates methods for dynamically reallocating storage and memory resources during run-time execution of workloads in distributed XaaS computing system, according to an embodiment of the invention. In particular, FIG. 3 schematically illustrates methods that can be implemented for reallocating data storage resources in instances where bottlenecks in storage throughput are detected. FIG. 3 schematically illustrates a system memory 300 comprising volatile memory 302 and storage-class memory (SCM) 310 comprising a first non-volatile memory 312 and a second non-volatile memory 314, which are accessible as a memory resource. In addition, FIG. 3 illustrates a hierarchical tiered storage system 320 comprising a first data storage array 322 (e.g., Tier 0), a second data storage array 324 (e.g., Tier 1) and a third data storage array (e.g., Tier 2). Further, FIG. 3 depicts an accelerator device 330 comprising processing cores 332 and associated memory 334. The system memory 300 and the accelerator device 330 reside "server side" on the same host server or on different host servers. The hierarchical tiered storage system 320 comprises an "off-host storage infrastructure" which comprises, e.g., network-attached storage (NAS), direct-attached storage (DAS), a storage area network (SAN), etc.

The system memory 300 can be implemented using a hierarchical memory tier structure wherein the volatile system memory 302 is configured as the highest-level memory tier, and the non-volatile system memories 312 and 314 of the SCM 310 are configured as lower level memory tiers which are utilized as high-speed load/store non-volatile memory devices on a processor memory bus (i.e., data is accessed with loads and stores, instead of with I/O reads and writes). The volatile memory 302 may be a dynamic random-access memory (DRAM) (e.g., DRAM DIMM (Dual In-line Memory Module), or other forms of volatile RAM. The non-volatile memories 312 and 314 may be one or more of a NAND Flash storage device, a SSD device, or other types of next generation non-volatile memory (NGNVM) devices.

In the example embodiment of FIG. 3, the hierarchical tiered storage system 320 comprises three tiers of a tiered storage hierarchy, wherein the first data storage array 322 is configured as the highest-level storage tier, and the third data storage array 326 is configured as the lowest-level storage tier. In general, the lower the number of the tier in a tiered storage hierarchy, the more expensive the storage media and the less time it takes to retrieve data on that tier (i.e., lower data access latency). In one exemplary embodiment, the first data storage array 322 comprises a solid-state storage array (e.g., flash memory array implemented as a "top of rack" flash memory array), the second data storage array 324 comprises DAS devices or NAS servers which implement a HDD RAID storage array, and the third data storage array comprises a SAN of storage devices.

The storage throughput analysis and prediction module 340 implements methods that are configured to monitor the throughput of data reads/writes to the various memory and storage devices shown in FIG. 3 to detect bottlenecks in storage throughput. In one embodiment, the workload monitor module 143 (FIG. 1) implements functions of the storage throughput analysis and prediction module 340. When reading and writing to a storage system is detected to be a bottleneck for a given executing workload, a live migration process can be performed to move at least a portion, or all of the data associated with the running workload from one storage/memory location to another storage/memory location to increase storage throughput performance.

For example, FIG. 3 schematically illustrates a live data migration process 342 in which data of a running workload is moved from the second data storage array 324 to the first data storage array 322, wherein it is assumed that the data access latency of the first data storage array 322 is less than the data access latency of the first data storage array 322. In addition, FIG. 3 schematically illustrates a live data migration process 344 in which data of a running workload is moved or otherwise pre-fetched from the third data storage array 326 to the memory 334 of the accelerator device 330. In other embodiments, live data migration can be used to move data of a running workload, or portions of data of the running workload, from a storage tier of the hierarchical tiered storage system 320 to one or more of the non-volatile memories 312 and 314 of the system memory 300. In another embodiment, the storage throughput analysis and prediction module 340 implements a prediction algorithm which in conjunction with a real-time analysis is configured to predict which portions of data storage will be read next during execution of the workload, and if the storage is expected to be a bottleneck, the data portions can be either pre-fetched or moved, in advance, to a different storage tier of the hierarchical tiered storage system 320, to a different tier of the system memory 300, and/or to the memory 334 of the hardware accelerator device 330.

Figure 4:
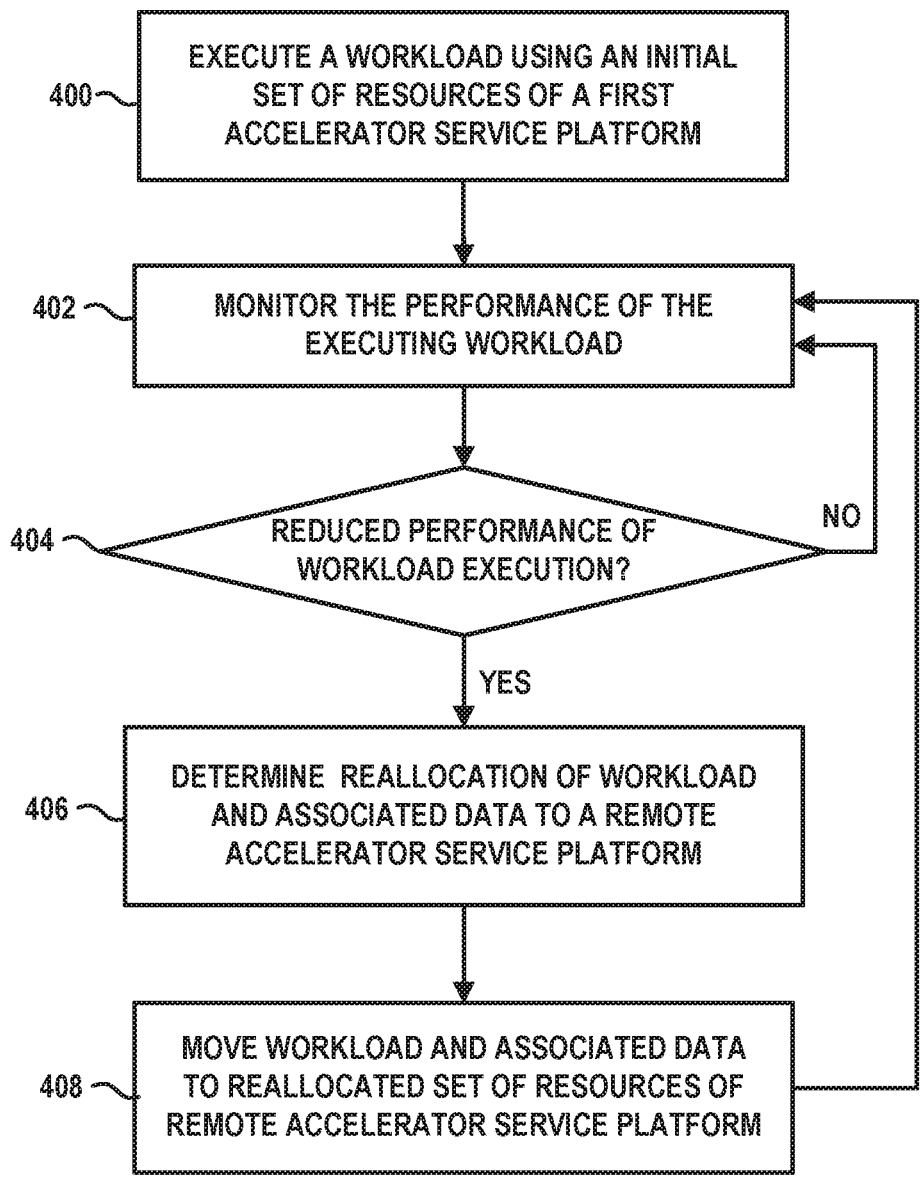
FIG. 4 is a flow diagram of a method for dynamically migrating a run-time execution of a workload to a remote XaaS computing system, according to an embodiment of the invention.

FIG. 4 is a flow diagram of a method for dynamically migrating a run-time execution of a workload to a remote XaaS computing system, according to an embodiment of the invention. In one embodiment, FIG. 4 illustrates operating modes of various modules of the service controller 140 in the accelerator service platform 130 of FIG. 1. The accelerator service platform 130 executes a given workload using an initial set of resources that are allocated to the given workload by the resource allocation and provisioning module 142 (block 400). During real-time execution of the given workload, the workload monitor module 143 of the service controller 140 will monitor the performance of the executing workload in real-time to determine if performance of the executing workload decreases, or does not otherwise meet, an expected performance level (block 402). In response to detecting a reduced performance in the workload execution (affirmative determination in block 404), the resource allocation and provisioning module 142 will proceed to determine a reallocation of the running workload and associated data to resources of a remote XaaS platform (block 406) with the expectation that such reallocation would increase the performance of the executing workload by, e.g., utilizing different types of accelerator resources not present on the current XaaS platform. The live migration module 144 is then invoked to perform a live migration process to move the executing workload and associated data to the reallocated set of resources on the remote XaaS platform (block 408).

For example, the method of FIG. 4 can be utilized to migrate a live workload and associated data over the cloud to another remote XaaS platform having specialized computing resources and hardware to which the running workload can be transferred to increase the performance of workload execution. For example, the running workload and associated data may be moved to a different data center to run on different hardware, e.g., a deep learning workload may work significantly faster using TPU resources of a remote data center or XaaS platform as compared to using GPU resources of the current XaaS platform. When the system analyzes a running workload and determines that the workload will execute faster in a TPU environment, the system can migrate the workload and associated data from a cloud platform with GPU resources (virtual and physical GPU resource) to another remotely located cloud platform with TPU resources (virtual or physical TPU resources). The migration of the running workload and associated data can be performed using live migration methods, or by transferring the workload and data to a remote cloud platform and then restarting the workload execution from a previous checkpoint (e.g., previous state) of the running workload.

With this reallocation and migration process, if an abstraction layer does not expose virtual GPUs on the first platform but exposes a virtual deep learning API, the workload and data movement to the second platform can be performed seamlessly. This provides elasticity for cloud computing, wherein a single interface is presented to an application in the data center, while workload execution can be performed seamlessly and transparently to the application using the appropriate resources in the given data center and/or a remote data center or cloud platform as needed. The analysis (blocks 404 and 406) will determine the entirety of the resource needs for the executing workload and will export elements to the cloud to add compute and storage resource, while performing a live migration (e.g., vMotion and/or cMotion) to automate the data population based on the application needs and to optimize performance.

Figure 5:
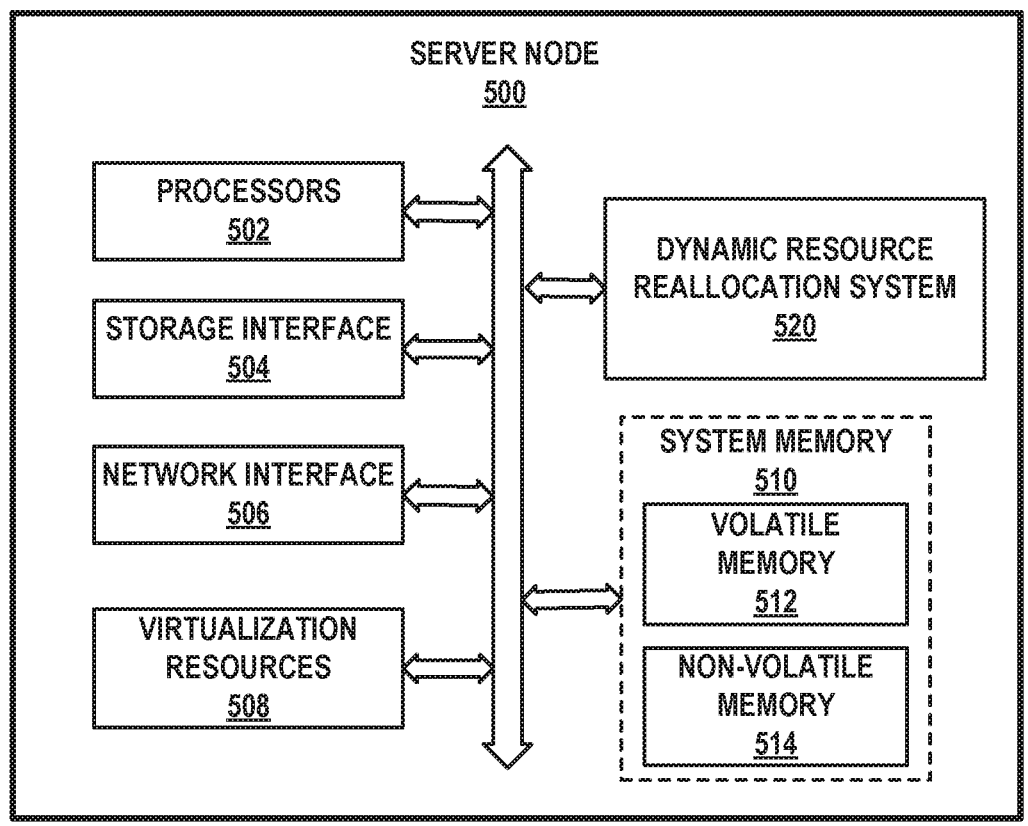
FIG. 5 schematically illustrates an embodiment of a computing node which can host a dynamic resource reallocation system configured to dynamically reallocate resources during run-time execution of workloads in a distributed XaaS computing system, according to an embodiment of the invention.

FIG. 5 schematically illustrates an embodiment of a computing node which can host a dynamic resource reallocation system configured to dynamically reallocate resources during run-time execution of workloads in a distributed XaaS computing system, according to an embodiment of the invention. In particular, FIG. 5 schematically illustrates an embodiment of a server node 500 which comprises processors 502, storage interface circuitry 504, network interface circuitry 506, virtualization resources 508, and system memory 510. The system memory 510 comprises volatile memory 512 and non-volatile memory 514, which can be implemented as a storage class memory. The server node 500 hosts a dynamic resource reallocation system 520 which implements methods and functions as discussed above, for example, in conjunction with FIGS. 2, 3 and 4. In one embodiment, the dynamic resource reallocation system 520 implements the functionalities of constituent modules such as the resource allocation and provisioning module 142, the workload monitor module 143, the live migration module 144 (FIG. 1), and the storage throughput analysis and prediction module 340 (FIG. 3).

The processors 502 comprise one or more types of hardware processors that are configured to process program instructions and data to execute a native operating system (OS) and applications that run on the server node 500. For example, the processors 502 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general-purpose processor.

The storage interface circuitry 504 enables the processors 502 to interface and communicate with the system memory 510, and other local storage and off-infrastructure storage media, using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc. The network interface circuitry 506 enables the server node 500 to interface and communicate with a network and other system components. The network interface circuitry 506 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 508 can be instantiated to execute one or more applications or functions which are hosted by the server node 500. For example, the virtualization resources 508 can be configured to implement the various modules and functionalities of the dynamic resource reallocation system 520. In one embodiment, the virtualization resources 508 comprise virtual machines that are implemented using a hypervisor platform which executes on the server node 500, wherein one or more virtual machines can be instantiated to execute functions of the server node 500. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 500, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 508 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 500 and the dynamic resource reallocation system 520. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the dynamic resource reallocation system 520 comprises software that is persistently stored in the local storage resources and loaded into the system memory 510 resources, and executed by the processors 502 to perform respective functions as described herein. In this regard, the system memory 510 resources, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The system memory 510 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 502 to execute a native operating system and one or more applications hosted by the server node 500, and to temporarily store data that is utilized and/or generated by the native OS and application programs running on the server node 500. For example, the volatile memory 512 may be DRAM (e.g., DRAM DIMM), or other forms of volatile RAM. The non-volatile memory 514 can be configured and accessible as a memory resource. For example, the non-volatile memory 514 may be one or more of a NAND Flash storage device, an SSD device, or other types of NGNVM devices. The non-volatile memory 514 can be implemented with any suitable NGNVM DIMM, or NGNVM add-in card (AIC) module.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

executing a workload on at least a first server node in a distributed accelerator-as-a-service computing system using a first set of resources allocated to the executing workload, wherein the first set of resources comprises accelerator resources;

monitoring a performance of the executing workload to detect a bottleneck condition which causes a decrease in the performance of the executing workload, wherein monitoring the performance of the executing workload comprises (i) monitoring a storage throughput of data access operations that are performed by the executing workload on at least the first server node to access data in a storage tier of a data storage system which is allocated to store data associated with the executing workload, to thereby determine whether said storage throughput causes a first bottleneck condition due to an increase in latency of the data access operations, and (ii) monitoring communication between a first processor and a second processor executing the workload, the first processor residing on the first server node and the second processor residing on a second server node, to thereby determine whether said communication causes a second bottleneck condition due to at least one of an increase in a latency of communication between the first and second processors and a decrease in bandwidth of communication between the first and second processors;

in response to determining that said storage throughput causes the first bottleneck condition:

allocating a second set of resources to the executing workload which results in at least one of reducing and eliminating the first bottleneck condition, wherein allocating the second set of resources comprises allocating memory of at least one integrated memory device of at least one hardware accelerator device which resides on the first server node to store at least a portion of the data associated with the executing workload, wherein the second set of resources comprises the at least one integrated memory device of the at least one hardware accelerator device which resides on the first server node; and performing a live migration process to move the portion of the data associated with the executing workload to the allocated memory of the at least one integrated memory device of the at least one hardware accelerator device which resides on the first server node; and executing the workload using the second set of resources; and in response to determining that said communication between the first processor and the second processor causes the second bottleneck condition:

allocating a third set of resources to the executing workload which results in at least one of reducing and eliminating the second bottleneck condition, wherein allocating the third set of resources comprises allocating a third processor in place of the first processor, wherein the third processor resides on the second server node;

performing a live migration process to move the executing workload to the third set of resources which at least partially resides on the second server node; and executing the workload using the third set of resources.

2. The method of claim 1, wherein the accelerator resources comprise one of hardware accelerator resources, virtual accelerator resources, and a combination of hardware and virtual accelerator resources.

3. The method of claim 1, wherein second set of resources comprises at least one resource of the first set of resources.

4. The method of claim 1, wherein the second set of resources comprises none of the resources of the first set of resources.

5. The method of claim 1, wherein
performing the live migration process to move the executing workload to the third set of resources comprises migrating a running virtual machine from the first server node to the second server node while continuously running the migrating virtual machine for executing the workload using the third set of resources.

6. The method of claim 1, wherein
performing the live migration process to move the executing workload to the third set of resources comprises migrating a running container application from the first server node to the second server node while continuously running the migrating container application for executing the workload using the third set of resources.

7. The method of claim 1, wherein:
monitoring the performance of the executing workload to detect a bottleneck condition further comprises monitoring a storage throughput of data access operations of the executing workload to a first data storage tier of the data storage system which is allocated to store data associated with the executing workload to thereby determine whether said storage throughput of the data access operations of the executing workload to the first data storage tier of the data storage system causes a third bottleneck condition due to an increase in latency of the data access operations; and in response to determining that said storage throughput of the data access operations of the executing workload to the first data storage tier of the data storage system causes the third bottleneck condition, the method further comprising:
allocating a fourth set of resources to the executing workload which results in at least one of reducing and eliminating the third bottleneck condition, wherein allocating the fourth set of resources comprises allocating at least one of (i) a second data storage tier of the data storage system and (ii) a non-volatile service class memory tier, to store at least a portion of the data associated with the executing workload;

performing a live migration process to move the portion of the data associated with the executing workload to the allocated one of (i) the second data storage tier of the data storage system and (ii) the non-volatile service class memory tier memory; and executing the workload using the fourth set of resources.

8. The method of claim 1, wherein:
monitoring the performance of the executing workload to detect a bottleneck condition further comprises monitoring a performance level of the executing workload to thereby determine whether said performance level of the executing workload causes a third bottleneck condition due to the performance level of the executing workload not meeting an expected performance level; and in response to determining that said performance level not meeting the expected performance level causes the third bottleneck condition, the method further comprising:
allocating a fourth set of resources to the executing workload which results in at least one of reducing and eliminating the third bottleneck condition, wherein allocating the fourth set of resources comprises allocating a remote set of resources which resides in a second distributed accelerator-as-a-service computing system;

performing a live migration process to move the executing workload to the fourth set of resources which at least partially resides in the second distributed accelerator-as-a-service computing system; and executing the workload using the fourth set of resources.

9. An article of manufacture comprising a non-transitory processor-readable storage medium having stored therein program code of one or more software programs, wherein the program code is executable by one or more processors to perform a method which comprises:
executing a workload on at least a first server node in a distributed accelerator-as-a-service computing system using a first set of resources allocated to the executing workload, wherein the first set of resources comprises accelerator resources;

monitoring a performance of the executing workload to detect a bottleneck condition which causes a decrease in the performance of the executing workload, wherein monitoring the performance of the executing workload comprises (i) monitoring a storage throughput of data access operations that are performed by the executing workload on at least the first server node to access data in a storage tier of a data storage system which is allocated to store data associated with the executing workload, to thereby determine whether said storage throughput causes a first bottleneck condition due to an increase in latency of the data access operations, and (ii) monitoring communication between a first processor and a second processor executing the workload, the first processor residing on the first server node and the second processor residing on a second server node, to thereby determine whether said communication causes a second bottleneck condition due to at least one of an increase in a latency of communication between the first and second processors and a decrease in bandwidth of communication between the first and second processors;

in response to determining that said storage throughput causes the first bottleneck condition:
allocating a second set of resources to the executing workload which results in at least one of reducing and eliminating the first bottleneck condition, wherein allocating the second set of resources comprises allocating memory of at least one integrated memory device of at least one hardware accelerator device which resides on the first server node to store at least a portion of the data associated with the executing workload, wherein the second set of resources comprises the at least one integrated memory device of the at least one hardware accelerator device which resides on the first server node; and performing a live migration process to move the portion of the data associated with the executing workload to the allocated memory of the at least one integrated memory device of the at least one hardware accelerator device which resides on the first server node; and executing the workload using the second set of resources; and in response to determining that said communication between the first processor and the second processor causes the second bottleneck condition:

allocating a third set of resources to the executing workload which results in at least one of reducing and eliminating the second bottleneck condition, wherein allocating the third set of resources comprises allocating a third processor in place of the first processor, wherein the third processor resides on the second server node;

performing a live migration process to move the executing workload to the third set of resources which at least partially resides on the second server node; and executing the workload using the third set of resources.

10. The article of manufacture of claim 9, wherein performing the live migration process to move the executing workload to the third set of resources comprises at least one of (i) migrating a running virtual machine from the first server node to the second server node while continuously running the migrating virtual machine for executing the workload using the third set of resources, and (ii) migrating a running container application from the first server node to the second server node while continuously running the migrating container application for executing the workload using the third set of resources.

11. The article of manufacture of claim 9, wherein:

monitoring the performance of the executing workload to detect a bottleneck condition further comprises monitoring a storage throughput of data access operations of the executing workload to a first data storage tier of the storage system which is allocated to store data associated with the executing workload to thereby determine whether said storage throughput of the data access operations of the executing workload to the first data storage tier of the data storage system causes a third bottleneck condition due to an increase in latency of the data access operations; and in response to determining that said storage throughput of the data access operations of the executing workload to the first data storage tier of the data storage system causes the third bottleneck condition, the method further comprising:

allocating a fourth set of resources to the executing workload which results in at least one of reducing and eliminating the third bottleneck condition, wherein allocating the fourth set of resources comprises allocating at least one of (i) a second data storage tier of the data storage system and (ii) a non-volatile service class memory tier, to store at least a portion of the data associated with the executing workload;

performing a live migration process to move the portion of the data associated with the executing workload to the allocated one of (i) the second data storage tier of the data storage system and (ii) the non-volatile service class memory tier memory; and executing the workload using the fourth set of resources.

12. The article of manufacture of claim 9, wherein:

monitoring the performance of the executing workload to detect a bottleneck condition further comprises monitoring a performance level of the executing workload to thereby determine whether said performance level of the executing workload causes a third bottleneck condition due to the performance level of the executing workload not meeting an expected performance level; and in response to determining that said performance level not meeting the expected performance level causes the third bottleneck condition, the method further comprising:

allocating a fourth set of resources to the executing workload which results in at least one of reducing and eliminating the third bottleneck condition, wherein allocating the fourth set of resources comprises allocating a remote set of resources which resides in a second distributed accelerator-as-a-service computing system;

performing a live migration process to move the executing workload to the fourth set of resources which at least partially resides in the second distributed accelerator-as-a-service computing system; and executing the workload using the fourth set of resources.

13. The article of manufacture of claim 9, wherein the accelerator resources comprise one of hardware accelerator resources, virtual accelerator resources, and a combination of hardware and virtual accelerator resources.

14. The article of manufacture of claim 9, wherein second set of resources comprises at least one resource of the first set of resources.

15. A system, comprising:

a cluster of server nodes each comprising accelerator resources, wherein the cluster of server nodes is configured as a distributed accelerator-as-a-service computing system;

a service controller comprising at least one processor, and memory configured to store program code, wherein the program code is executable by the at least one processor of the service controller to implement a resource allocation system for the one or more server nodes within the cluster of server nodes, wherein the resource allocation system implemented by the service controller is configured to:

allocate a first set of resources for executing a workload on at least a first server node in the distributed accelerator-as-a-service computing system, wherein the first set of resources comprises accelerator resources of the distributed accelerator-as-a-service computing system;

monitor a performance of the executing workload to detect a bottleneck condition which causes a decrease in the performance of the executing workload, wherein in monitoring the performance of the executing workload, the resource allocation system is configured to (i) monitor a storage throughput of data access operations that are performed by the executing workload on at least the first server node to access data in a storage tier of a data storage system which is allocated to store data associated with the executing workload, to thereby determine whether said storage throughput causes a first bottleneck condition due to an increase in latency of the data access operations, and (ii) monitor communication between a first processor and a second processor, the first processor residing on the first server node and the second processor residing on a second server node, executing the workload to thereby determine whether said communication causes a second bottleneck condition due to at least one of an increase in a latency of communication between the first and second processors and a decrease in bandwidth of communication between the first and second processors;

in response to determining that said storage throughput causes the first bottleneck condition, the resource allocation system is configured to:
  allocate a second set of resources to the executing workload which results in at least one of reducing and eliminating the first bottleneck condition, wherein allocating the second set of resources comprises allocating memory of at least one integrated memory device of at least one hardware accelerator device which resides on the first server node to store at least a portion of the data associated with the executing workload, wherein the second set of resources comprises the at least one integrated memory device of the at least one hardware accelerator device which resides on the first server node; and
  perform a live migration process to move the portion of the data associated with the executing workload to the allocated memory of the at least one integrated memory device of the at least one hardware accelerator device which resides on the first server node, to thereby enable execution of the workload using the second set of resources; and in response to determining that said communication between the first processor and the second processor causes the second bottleneck condition, the resource allocation system is configured to:
  allocate a third set of resources to the executing workload which results in at least one of reducing and eliminating the second bottleneck condition, wherein allocating the third set of resources comprises allocating a third processor in place of the first processor, wherein the third processor resides on the second server node;
  perform a live migration process to move the executing workload to the third set of resources which at least partially resides on the second server node; and
  execute the workload using the third set of resources.

16. The system of claim 15, wherein
the resource allocation system is configured to perform the live migration process to move the executing workload to the third set of resources by at least one of (i) migrating a running virtual machine from the first server node to the second server node while continuously running the migrating virtual machine for executing the workload and (ii) migrating a running container application from the first server node to the second server node while continuously running the migrating container application for executing the workload, to thereby enable execution of the workload using the third set of resources.

17. The system of claim 15, wherein:
in monitoring the performance of the executing workload to detect a bottleneck condition, the resource allocation system is further configured to monitor a storage throughput of data access operations that are performed by the executing workload on at least the first server node to access data in a first data storage tier of the data storage system which is allocated to store data associated with the executing workload, to thereby determine whether said storage throughput causes a third bottleneck condition due to an increase in latency of the data access operations; and in response to determining that said storage throughput of the data access operations of the executing workload to the first data storage tier of the data storage system causes the third bottleneck condition, the resource allocation system is configured to:
  allocate a fourth set of resources to the executing workload which results in at least one of reducing and eliminating the third bottleneck condition, wherein allocating the fourth set of resources comprises allocating at least one of (i) a second data storage tier of the data storage system to reduce the latency of the data access operations and (ii) a non-volatile service class memory tier to store at least a portion of the data associated with the executing workload; and
  perform a live migration process to move the portion of the data associated with the executing workload to the allocated one of (i) the second data storage tier of the data storage system and (ii) the non-volatile service class memory tier memory, to thereby enable execution of the workload using the fourth set of resources.

18. The system of claim 15, wherein:
in monitoring the performance of the executing workload to detect a bottleneck condition, the resource allocation system is further configured to monitor a performance level of the executing workload to thereby determine whether said performance level of the executing workload causes a third bottleneck condition due to the performance level of the executing workload not meeting an expected performance level; and in response to determining that said performance level not meeting the expected performance level causes the third bottleneck condition, the resource allocation system is configured to:
  allocate a fourth set of resources to the executing workload which results in at least one of reducing and eliminating the third bottleneck condition, wherein allocating the fourth set of resources comprises allocating a remote set of resources which resides in a second distributed accelerator-as-a-service computing system;
  perform a live migration process to move the executing workload to the fourth set of resources which at least partially resides in the second distributed accelerator-as-a-service computing system, to thereby enable execution of the workload using the fourth set of resources.

19. The system of claim 15, wherein the accelerator resources comprise one of hardware accelerator resources, virtual accelerator resources, and a combination of hardware and virtual accelerator resources.

20. The system of claim 15, wherein second set of resources comprises at least one resource of the first set of resources.

21. The system of claim 15, wherein the second set of resources comprises none of the resources of the first set of resources.

* * * * *